United States Patent [19]

Giulio et al.

[11] Patent Number: 4,492,553

[45] Date of Patent: Jan. 8, 1985

[54] AUTOMATIC MACHINE FOR FORMING SHAPED PIECES OF DOUGH

[76] Inventors: Folli Giulio, Via Ines Bedeschi, 5-Conselice-Ravenna; Casadei Marino, Via Provinciale S. Mauro, 3501-Cesena (Forli), both of Italy

[21] Appl. No.: 506,121

[22] Filed: Jun. 20, 1983

[30] Foreign Application Priority Data

Oct. 22, 1982 [IT] Italy ................... 3571 A/82

[51] Int. Cl.³ .................. A21C 11/10; A21C 9/08
[52] U.S. Cl. ..................... 425/308; 425/391
[58] Field of Search ............ 425/296, 297, 334, 319, 425/320, 161, 308, 323, 302.1, 301, 456, 341, 364 B, 168, 324.1, 364 R, 375, 391, 447, 289, 298, 312; 426/501, 512

[56] References Cited

U.S. PATENT DOCUMENTS

| | | | |
|---|---|---|---|
| 698,814 | 4/1902 | Chase et al. | 425/334 |
| 1,701,850 | 2/1929 | Holtzman | 425/296 |
| 2,499,397 | 3/1950 | Lyon | 264/310 |
| 2,591,546 | 4/1952 | Hettinger | 425/319 |
| 3,433,182 | 3/1969 | Thompson | 425/319 |

*Primary Examiner*—Willard E. Hoag
*Attorney, Agent, or Firm*—Balogh, Osann, Kramer, Dvorak, Genova & Traub

[57] ABSTRACT

An automatic machine for forming shaped dough pieces which are fed, as strips, by a conveyor and discharged onto a baking tin. The frame oscillates along a horizontal plane and each point thereof describes a closed trajectory so as to form shaped pieces of a closed or open configuration. In this way, it is possible to form in the baking tin placed beneath the conveyor belt, in consequence of the combination of the oscillating motion of the tin and the discharge therein of the strips, pieces of dough that extend along closed trajectories, particular trajectories being constituted by two identical superimposed branches. After the shaped dough pieces have been formed, suitable cutting means shear the parts of the strips of dough situated between the conveyor and the baking tin disposed below the conveyor.

5 Claims, 11 Drawing Figures

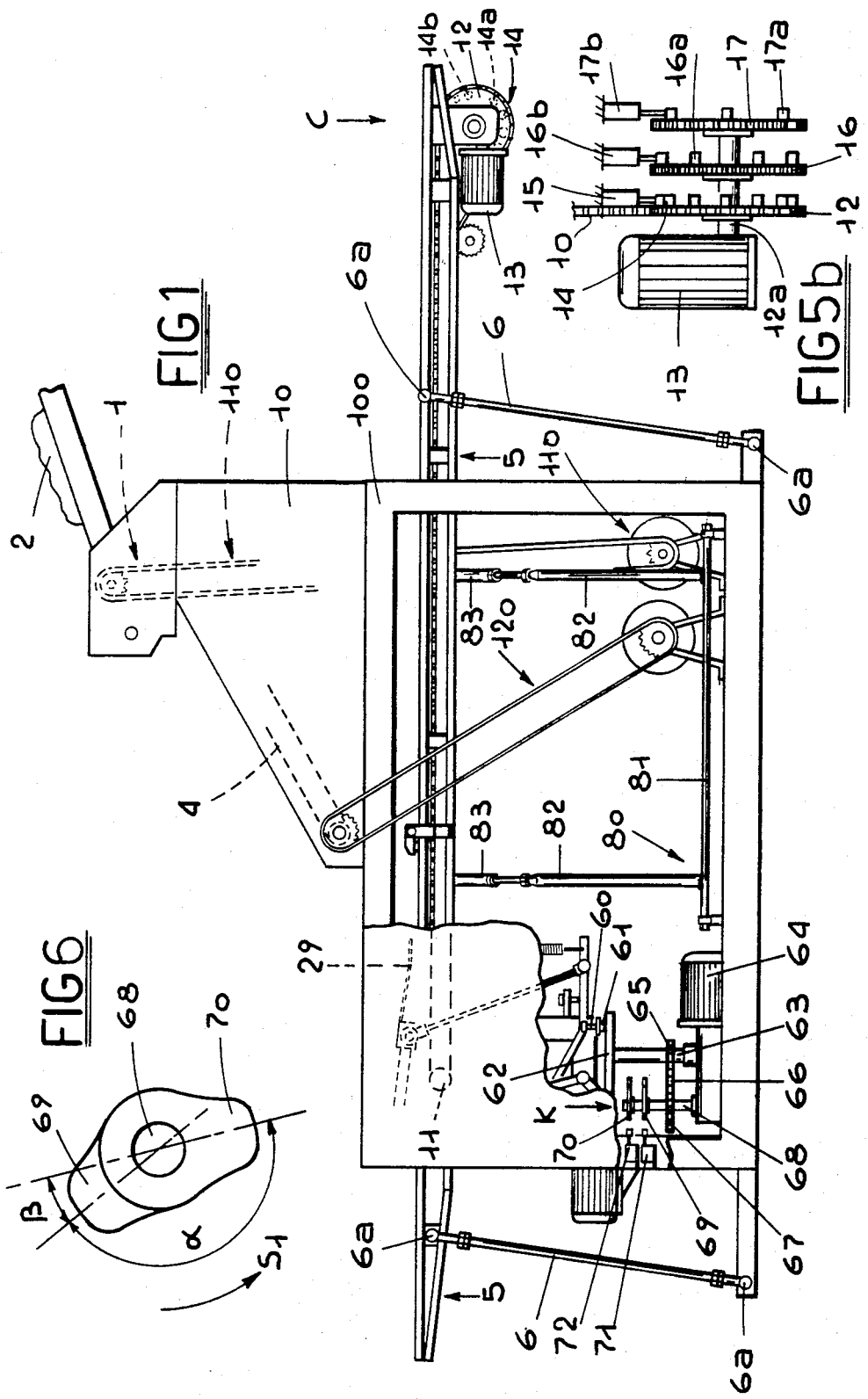

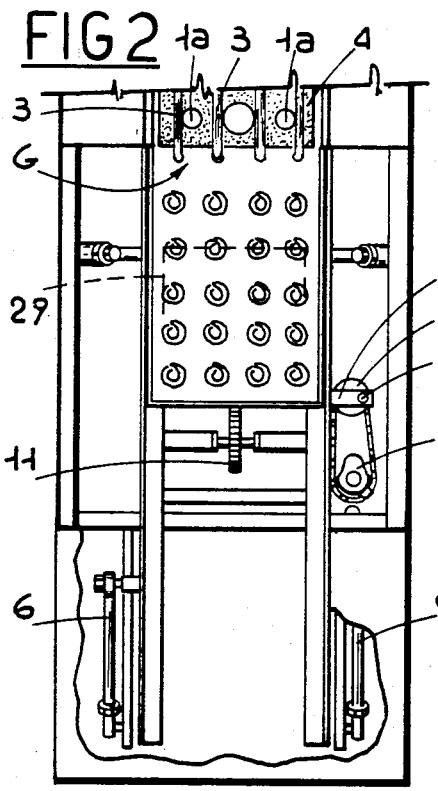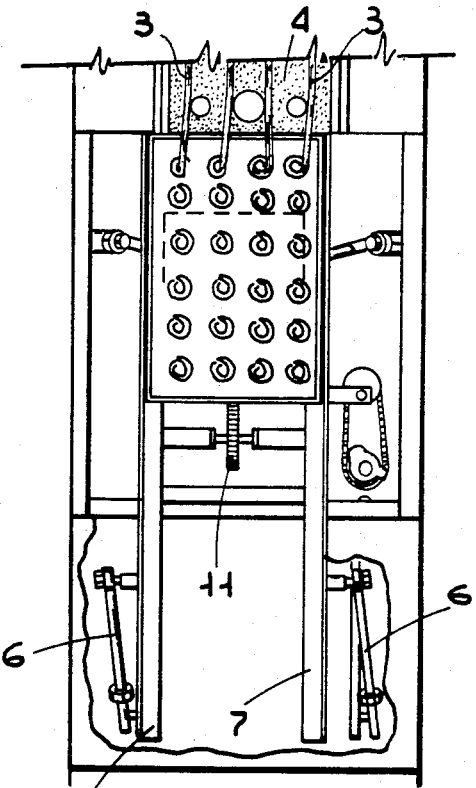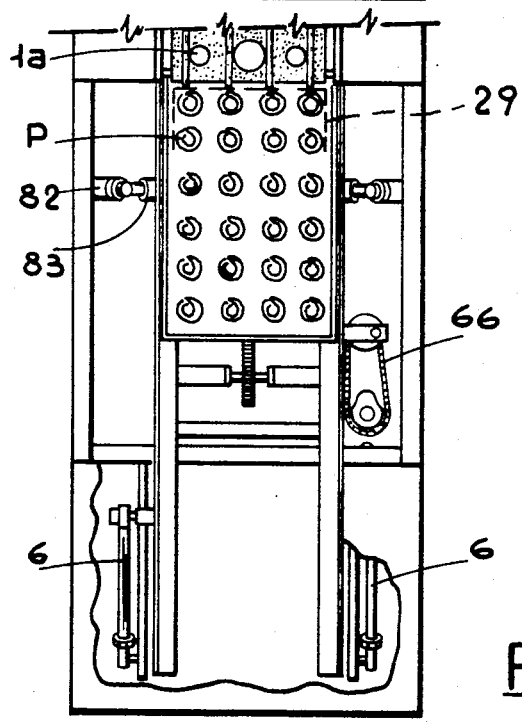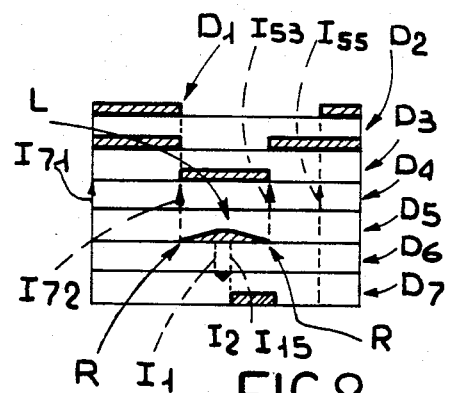

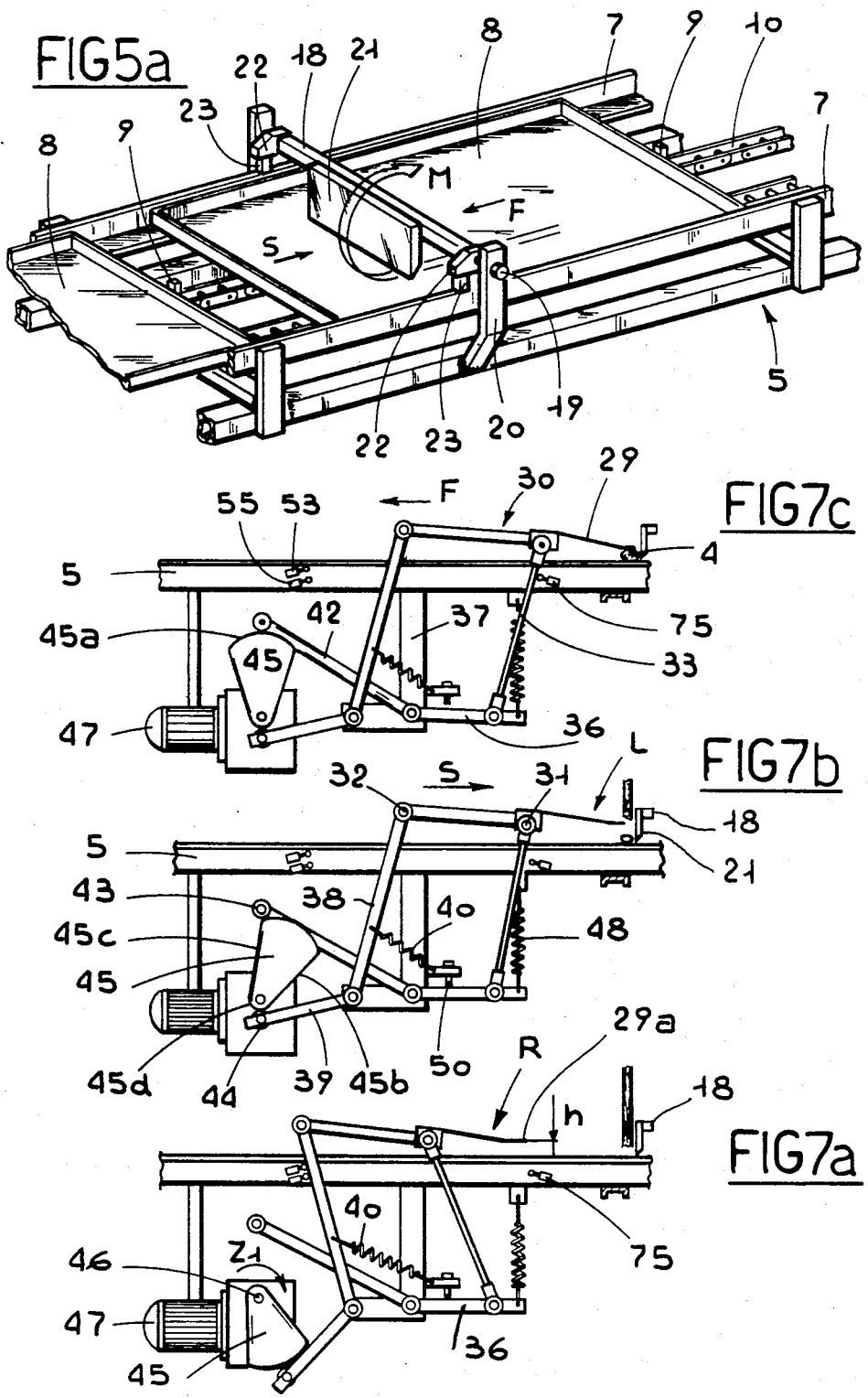

AUTOMATIC MACHINE FOR FORMING SHAPED PIECES OF DOUGH

BACKGROUND OF THE INVENTION

The invention relates to an automatic machine for forming shaped pieces of dough.

DESCRIPTION OF THE PRIOR ART

An apparatus is already known, see Italian patent application No. 3442 A/79 deposited on 6/24/79, destined to form shaped pieces of dough of the endless ring type. The aspect that characterized the technical solution forming the subject of the said application was centered around the means with which to achieve shaping the dough into endless rings.

It was envisaged for the said means there being a semicircular shaping element movable vertically and designed to intercept on a conveyor belt, when in the lower position, each strip of dough positioned transversely thereon; in this way the "U" conformation of each of the said strips was defined.

The raising of the shaping element left free the "U" shaped strip, and the former then adopted a circular section shape movable vertically from the lower position close to the conveyor (in which the said strip was intercepted) to an upper position. The operation, one after the other, of two arms caused, first of all, one limb of the said "U" to be folded onto the shaping element, and then the other limb to be folded onto the said shaping element, with the extremities of the said limbs superimposed.

The subsequent operation of a presser member caused the said superimposed extremities to be welded, after which, with the raising of the shaping element, the operation of forming a piece of dough into an endless ring was at an end.

The constructional complications are apparent of a technical solution of the nature outlined above which, moreover, necessitated there being further means, placed upstream of those described in the foregoing text, for forming strips of the predetermined dimensions, with all this affecting negatively the cost of the apparatus.

Also known is a machine (see Italian patent application No. 3353 A/80 deposited on 3/14/1980) comprising a device for manipulating the moistened and kneaded flour, designed to furnish simultaneously a number of strips of dough that are received by corresponding downward turned tubular elements. The latter are articulated at the top to a fixed support and are driven synchronously in such a way as to describe, with the lower extremities thereof, the same number of closed trajectories as there are tubular elements, along a plane parallel to an underneath conveyor.

The operation of the device and the driving of the tubular elements make it possible to form, on the conveyor, pieces of dough into endless rings with the relevant extremities superimposed.

The shearing of the strip and the welding of the said superimposed extremities are effected, in successive stages, by a cutter blade.

With the return of the blade towards the non operative position, the conveyor moves forward one step, and this enables a fresh cycle, identical to the preceding one, to be commenced.

SUMMARY OF THE INVENTION

The object of the invention is to make available on automatic machine able to form dough into shaped pieces of any closed or open extension without utilizing either shaping elements or movable tubular elements that receive the strips of dough, with everything being achieved in such a way as to obtain a high degree of productivity, without this being to the detriment of the functional aspects of the machine.

Another object of the invention is to make available a machine as above, which besides satisfying the preceding object, is simple in construction and easy to maintain.

The above mentioned objects are achieved with the automatic machine according to the invention comprising: a device for manipulating the moistened and kneaded flour, designed to furnish at least one continuous strip of dough and set in intermittent operation by first drive means; a first conveyor, set in intermittent operation by second drive means synchronously with the said first drive means, placed downstream of the said manipulation device, oriented downwards and destined to receive the said strip of dough in order to carry it downwards into the region of a station where the said pieces of dough are defined; a second conveyor positioned beneath the first conveyor, constituting, jointly with the lower extremity of the latter, the above mentioned station that is destined to receive, resting thereon, the said strip and is set in intermittent operation by third drive means on a time relationship basis with the said other drive means; and movable cutting means, positioned above the said second conveyor, downstream of the aforementioned station, destined to intercept, when in the operating position, the part of the said strip that is in between the first and the second conveyor, the said movable cutting means being set in intermittent operation by fourth drive means on a time relationship basis with the said first, second and third drive means; and wherein the said machine comprises: a frame for supporting the said second conveyor and the corresponding third drive means, and for supporting the said cutting means and the corresponding fourth drive means, secured by means of ball and socket joints to the extremity of at least three arms, the other extremity of which is secured, in each case, to a fixed structure by means of ball and socket joints; projections and blocks connected to the said frame, positioned beneath the lower extremity of the first conveyor perpendicularly to the movement direction of the second conveyor, destined, in cooperation with the said cutting means, when these are in the operating position, to shear the part of the strip that is in between the first and the second conveyor; means for operating the said frame on a time relationship basis with the said first, second, third and fourth drive means, defining for each point of the said frame, closed trajectories contained in horizontal planes; and means for stabilizing the vertical elevations of each point of the frame.

BRIEF DESCRIPTION OF THE DRAWINGS

The characteristics of the invention that do not emerge from what has been stated above, will become more apparent from the description given hereunder of one preferred embodiment of the machine, with precise reference to the accompanying tables of drawings, in which:

FIG. 1 shows, in a diagrammatic lateral view, the machine according to the invention, with certain parts removed;

FIGS. 2, 3 and 4 show, in (partial) diagrammatic views from above, the machine at the commencement, at an intermediate stage, and upon completion of the forming of strips of dough into endless rings, respectively;

FIG. 5a shows, in a perspective view, certain constructional details of the machine, particularly the projections and blocks of the cutter blade, and the means for moving forward the baking tins located on the second conveyor, while FIG. 5b shows, diagrammatically from above, the detail C in FIG. 1;

FIG. 6 shows, diagrammatically from above, the detail K in FIG. 1;

FIGS. 7a, 7b and 7c show, in diagrammatic lateral views, the cutter blade and the corresponding operating means, in three characteristic positions;

FIG. 8 shows, diagrammatically the timing graph for the machine in question.

DESCRIPTION OF THE PREFERRED EMBODIMENT

With reference to the above listed figures, at 100 has been shown the structure that supports the machine in question, from which rises, at one extremity, a frame 10 that carries a device 1 (of a known type) from which issues, when supplied with ordinary moistened and kneaded dough 2 (or flaky pastry), a plurality of strips 3 of dough (four strips, for example) which, because of the action of spacers 1a, are positioned appropriately one with respect to the other.

The strips 3 are received by the upper branch of a downward pointing conveyor belt 4 (FIG. 1), the task of which is to continuously transfer the said strips, maintaining the position of one with respect to the other unchanged, towards a station G where the pieces of dough P (in the case described herein, endless rings) are defined.

The device 1 and the conveyor 4 are set in operation by corresponding first and second drive means, 110 and 120, respectively, both of which synchronously subjected to first operating means, more about which will be said later on.

Underneath the conveyor 4 is placed a horizontal frame 5 supported by the bedplate of the structure 100 through four arms 6 arranged like the edges of a rectangular section prism. The connections of the arms with the frame and the bedplate are achieved by means of ball and socket joints 6a.

In order to stabilize the vertical elevation of the frame 5 provision is made for stabilizing means 80 constituted by a longitudinal bar 81 (rotatably restrained by the bedplate of the structure 100) with which are integral two rods 82 that are parallel with one another and point upwards. To the upper extremity of the said rods are pivoted the extremity of two arms 83 (in a way whereby the said arms are able to rotate with respect to the axes of said rods), the other extremity of each of the arms being pivoted to the frame 5. The frame 5 has in it, at the top, two longitudinal sections 7 parallel with one another, one with the "L" profile upright and the other with it overturned. The horizontal and the vertical sides of the sections constitute the support and the guide for baking tins 8 that are moved inching in the direction F (as will be stated hereinafter) through the medium of pins 9 provided in the links of a chain 10 mounted endlessly around two sprockets 11 and 12, the former driven and the latter the one that drives, supported by the frame 5. Sprocket 12 is powered by a geared motor 13 that is also supported by the frame 5. In one side thereof, the sprocket 12, the pitch circle of which is at least equal to the length of the baking tins, is provided with a plurality of locator members 14 spread evenly along an arc of circumference and destined to trip the movable element of a microswitch 15, more about which will be said hereinafter.

The angle existing between two consecutive locator members 14 defines a predetermined displacement "1" of the upper branch of the chain 10. In order to vary discretely the said displacement one has to resort to a plurality of disks 16, 17, . . . , keyed to the shaft 12a on which is fixedly mounted the sprocket 12, provided with locator members 16a, 17a, . . . (positioned angularly so as to define the predetermined displacement "1") for tripping corresponding microswitches 16b, 17b, etcetera.

Provided underneath the lower extremity of the conveyor 4 there is a crosspiece 18 pivoted at 19 to supports 20 integral with the sections 7, and the center of the crosspiece is provided with a downward projecting rod 21 (FIG. 5a), while the extremities thereof are provided with corresponding longitudinal projections 22, the abutment of each of which against corresponding blocks 23 integral with the sections 7, defines the equilibrium configuration of the group constituted by the crosspiece 18 and the rod 21.

The transverse dimensions of the rod 21 are less than the width of the baking tins but sufficient for it to be intercepted by the front walls of the tins consequentially to the movement of these in the direction F. The said interception causes the rotation in the direction M of the crosspiece 18 and allows the baking tins to pass underneath the rod 21. Vice versa, the forces applied to the rod 21 in the direction S, namely the opposite direction to F, do not cause any rotation of the crosspiece 18 by virtue of the projections 22 abutting with the blocks 23.

Above the sections 7, to the rear with respect to the lower extremity of the conveyor 4 (direction F), is placed a cutter blade 29 integral with and placed at the front of a frame 30, the latter being provided with a front pin 31 and a rear pin 32, both perpendicular to the direction F.

The extremities of the pin 31 are pivotally connected to the upper extremity of the two arms in a first pair of arms 33, while the lower extremity of the said arms is pivotally connected to the corresponding extremity of the two arms in a second pair of arms 36 whose other extremity is, in turn, pivotally connected to a support frame, shown globally at 37, positioned below the said frame 5 and integral there with. At least one of the arms 36 is subjected to the action of a spring 48 (anchored to the frame 5), the function of which consists in keeping one of the arms 36 flush up against the lower extremity of a threaded locator member 50 connected to the frame 37 (FIGS. 7a, 7b and 7c). By regulating the position of the locator member 50 in the housing provided for it, the height "h" is adjusted of the extremity 29a of the blade 29 with respect to the plane of the baking tins 8, the height "h" being greater than the height of the said tins.

Pivotally connected to the extremities of the pin 32 is the upper extremity of the two arms in a third pair of arms 38 whose lower extremity is pivotally connected to the frame 37 in a position to the rear with respect to the connection to the said frame of the arms 36.

At 39 has been shown a first arm connected in an integral fashion to one of the arms 38 in the region of the articulation with the frame 37. The other extremity of the arm 30 supports rotatably a roller 44 so positioned as to be intercepted by the outside profile of a cam 45 keyed to the shaft 46 of a geared motor 47 supported by the frame 37. More precisely, the roller 44 is maintained constantly in contact with the cam through the action of a spring 40 placed in between one of the arms 38 and the frame 37.

At 42 has been shown a second arm connected in an integral fashion to one of the arms 36 in the region of the articulation of this with the frame 37. The other extremity of the arm 42 supports rotatably a roller 43 that is at an elevation higher than the roller 44 and is destined to be intercepted solely by one part 45a of the cam 45. The profile of the latter is provided, in addition to the part 45a of symmetrical extension with respect to the center point thereof that is the most distant point with respect to the shaft 46) with two other parts 45b and 45c, one identical with the other and symmetrical with respect to the part 45a, as well as with an additional part 45d (concentric with respect to the shaft 46) that connects the parts 45b and 45c.

In FIG. 7a is shown the non-operative position R of the blade 29 defined by the roller 44 being in contact with the part 45a. The rotation of the cam in the direction $Z_1$ causes the roller 44 to slide over the profile 45b. The lengths of the arms 39, 38, 36 and 33 and the distance between the pins 31 and 32 are such as to cause, with the roller 44 sliding over the profile 45b, the blade 29 to traverse in the direction S. The said movement ceases when the roller 44 is located on the separation line of the profiles 45b–45d. In the said position the extremity 29a of the blade 29 is practically in contact with the rod 18: operative position "L" of the blade 29 (FIG. 7b).

The sliding of the roller 44 over the profile 45d does not involve any longitudinal displacement of the blade 29 but, in the said situation, the roller 43 is intercepted by the profile 45a and this, because of the particular mechanism created by the said arms, brings about the lowering of the blade 29 and the subsequent raising thereof (the inversion takes place in the center point of the profile 45a). When the roller 44 is located on the separation line of the profiles 45d–45c, the interception of the profile 45a with the roller 43 ceases; the sliding of the roller 44 over the said profile 45c results in the blade 29 returning towards the non-operative position (direction F). With the blade 29 in the non-operative position, the arm 38 intercepts two microswitches 53 and 55, the function of which will be clarified below.

With the underneath part of the frame 37 (FIG. 1) is integral one extremity of a horizontal bar 60, the other extremity of which is pivotally connected to a vertical pin 61 locked, in a removable fashion, to a horizontal disk 62 fixedly mounted on a vertical shaft 63 that can be turned by means of a geared motor 64. The pin 61 and the shaft 63 are provided with an eccentricity which, using known systems, can be adjusted.

Onto the shaft 63 is keyed a pinion 65 with which engages a chain 66 for driving another pinion 67, the shaft 68 of which is rotatably supported, in a known fashion, by the structure 100. It should be noted that the transmission ratio between the pinion 67 and the pinion 65 is 2:1, and the reason for this will be obvious in the text that follows.

Two cams 69 and 70, respectively, are fixedly mounted on the shaft 68, positioned one with respect to the other as shown in FIG. 6. More precisely, taking the cam 69 as the reference point, the cam 70 is in a retarded position with respect to the cam 69 by an angle $\alpha < 180°$ in the direction $S_1$. The cams 69 and 70 are destined to intercept corresponding microswitches 71 and 72, more about which will be said below.

A description will now be given of the operation of the machine in question, with reference to the timing graph in FIG. 8. $D_1$ therein shows the operating intervals of the drive means 110 and 120 that are subjected to first control means constituted by the microswitch 71 (on) and the microswitch 72 (off).

The graph $D_2$ in FIG. 8 shows the operating intervals of the geared motor 64 that is subjected to second control means constituted by the microswitch 53 (on) and the said microswitch 72 (off). $D_3$ therein shows the operating intervals of the geared motor 47 that is subjected to the said second control means (the geared motor 47 is, in fact, energized by the microswitch 55) and to the first control means (the geared motor is, in fact, deenergized by the microswitch 72). $D_4$ in FIG. 8 shows the operating moments $I_{71}$, $I_{72}$, $I_{53}$ and $I_{55}$ of the microswitches 71, 72, 53 and 55, respectively.

The graph $D_5$ in FIG. 8 shows the displacements of the blade 29 and, more precisely, the ascending line indicates the direction S, while the descending line indicates the direction F. $D_6$ in FIG. 8 shows the vertical displacements of the blade 29 in the operating position L and, more precisely, the descending line indicates the downward travel of the blade, while the ascending line indicates the upward travel thereof. $D_7$ in FIG. 8 shows the displacements, in the direction F, of the chain 10.

In order to describe the machine in question, let it be supposed that the geared motor 64 is energized, the geared motors 47 and 13 are deenergized and also that the drive means 110 and 120 are not in operation. With the cam 69 intercepting the microswitch 71 (moment $I_{71}$), the drive means 110 and 120 are set in operation.

With the excitation of the geared motor 64, the rotation is caused of the disk 62 which, in consequence of what has already been stated, gives each point of the frame 5 and of the means carried by this or supported thereon (for example, the baking tins), closed (circular) trajectories contained in the same horizontal plane. This, in combination with the unbroken transfer of the strips 3 from the conveyor 4 onto the underneath baking tin 8, brings about the same number of unbroken rings of dough P being formed as there are strips 3, with the extremities superimposed (FIGS. 2, 3 and 4) since the cessation in the operation of the drive means 110 and 120 (synchronously with the deenergizing of the geared motor 64), in consequence of the microswitch 72 being intercepted by the cam 70 (moment $I_{72}$), takes place after the shaft 63 has described an angle equal to $(180+\alpha)$ (FIG. 6) which, by virtue of the 2:1 ratio between the pinions 67 and 65 corresponds to an angle $2.(180+\alpha) > 360°$ described by any point of the baking tins, particularly the "on load" baking tin 8, that is to say the one positioned underneath the conveyor 4.

Furthermore, the microswitch 72 energizes the geared motor 47. On account of what has already been stated, the blade 29 moves into the operating position "L" (reached at the moment $I_1$). With the blade 29 in the operating position, the shearing takes place, in cooperation with the rod 21 that acts as a counter-blade, of the parts of the strips situated between the conveyor 4 and the underneath baking tin 8. Each cut extremity is laid over the other extremity of the shaped piece P since the circumferential extension of this is greater than one round angle.

Almost contemporaneously with the shearing, the lowering commences (moment $I_1$) of the blade 29 which causes the flattening of the superimposed extremities of the said shaped pieces (with the said extremities being welded one to the other). The lowering is followed by the raising of the blade which ends at the moment $I_2$, this moment defining both the commencement of the displacement in the direction F of the blade 29 and the energizing of the geared motor 13 (for example by means of a microswitch 75 intercepted by one of the arms 33) which causes, as previously stated, the movement of the baking tins in the direction F. The interception of a locator member 14 against the microswitch 15 causes the geared motor 13 to halt (moment $I_{15}$) with the baking tins all moved in the direction F in accordance with the displacement "1". In this way, following on after the transverse row of shaped pieces P in the "on load" baking tin, a subsequent row identical to the preceding one can be formed.

When the blade 29 again reaches the non-operative position, one of the arms 38 intercepts the microswitches 55 and 53. The former deenergizes the geared motor 47, while the latter deenergizes the geared motor 64. The said situation causes the rotation of the shaft 63 at an angle $\beta = 180 - \alpha$ which, because of what has already been stated, corresponds to a double angle $2\beta$ described by each point of the frame 5. In this way, at the time the cam 70 intercepts the microswitch 72, each point of the frame 5 has described a double round angle and thus the initial conditions that preceded the described machine cycle exist again. The same thing applies in respect of the successive identical cycles until the "on load" baking tin has been filled, when the positioning of the last row is defined by the end locator member 14b intercepting the microswitch 15. The subsequent energizing of the geared motor 13 until the first locator member 14a intercepts the microswitch 15, brings about the substitution of the already loaded baking tin with one that is empty and the positioning therein of the first row.

To obtain shaped pieces of dough P (endless rings) of a diameter greater or lesser than before, it is necessary to take action to vary correspondingly the eccentricity of the pin 61 with respect to the shaft 63. In such a case it is possible, if one wishes to do so, to vary the displacement "1" making full use of the disk 16 or 17 (or any other) and the corresponding microswitch 16a or 17a so as to define the required displacement "1".

Shaped pieces of dough P with any profile can be produced on the machine in question. In fact, by giving the frame 5 reciprocating rectilinear motion (through, for example, a connecting rod/crank system operated by the disk 62) in the longitudinal or transverse direction and by following the path imposed by the cam in the other direction (for example by means of an arm, integral with the frame 5, provided with a roller that slides in a corresponding groove and defines the compulsory path in question), pieces of dough are produced of any extension of the closed type. In particular, when the path imposed by the cam in the longitudinal or transverse direction is identical in the oscillations of the frame for both the directions, transverse or longitudinal, a trajectory is created constituted by two identical branches that are superimposed one over the other. In this way, it is possible to produce pieces of dough of any extension of the open type (for example, in the form of an "S").

The foregoing is understood to have been described solely as an unlimited example and thus eventual variants in the constructional details can be taken as all falling within the technical solution as described above and claimed hereunder.

What is claimed is:

1. In an automatic machine for forming shaped pieces of dough having closed or open configuration, comprising: a device for manipulating the moistened and kneaded flour, designed to furnish at least one continuous strip of dough and set in intermittent operation by first drive means; a first conveyor, set in intermittent operation by second drive means synchronously with the said first drive means, placed downstream of the said manipulation device, oriented downwards and destined to receive the said strip of dough in order to carry it downwards into the region of a station where the said pieces of dough are defined; a second conveyor positioned beneath the first conveyor, constituting, jointly with the lower extremity of the latter, the above-mentioned station that is destined to receive, resting thereon, the said strip and is set in intermittent operation by third drive means on a time relationship basis with the said other drive means; and movable cutting means, positioned above the said second conveyor, downstream of the aforementioned station, destined to intercept, when in the operating position, the part of the said strip that is in between the first and the second conveyor, the said movable cutting means being set in intermittent operation by fourth drive means on a time relationship basis with the said first, second and third drive means; the improvement comprising: a frame for supporting the said second conveyor and the corresponding third drive means, and for supporting the said cutting means and the corresponding fourth drive means, secured by means of ball and socket joints to the extremity of at least three arms, the other extremity of which is secured, in each case, to a fixed structure by means of ball and socket joints; projections and blocks connected to the said frame, positioned beneath the lower extremity of the first conveyor perpendicularly to the movement direction of the second conveyor, destined, in cooperation with the said cutting means, when these are in the operating position, to shear the part of the strip that is in between the first and the second conveyor; means for operating the said frame on a time relationship basis with the said first, second, third and fourth drive means, defining for each point of the said frame, closed trajectories contained in horizontal planes; and means for stabilizing the vertical elevations of each point of the frame.

2. Machine according to claim 1, wherein the means for operating the said frame comprise: a horizontal bar, one extremity of which is connected to the said frame while the other extremity is provided with a vertical pin pivotally connected to a horizontal element that connects thereto a vertical shaft, eccentric with respect to the said pin, set intermittently in operation by fifth drive means on a time relationship basis with the said other drive means.

3. Machine according to claim 1, wherein the means for operating the said frame comprise fifth means for driving the said frame in a straight line in the longitudinal direction coinciding with the direction in which the second conveyor moves forward, or in the transverse direction, and means that exert an effect on the said frame and are destined to cause the latter to follow an obligatory path in either the transverse or the longitudinal direction.

4. Machine according to claim 1, wherein the said stabilization means are constituted by at least one longitudinal bar, rotatably connected to the structure of the said machine, with which are integral at least two upward pointing rods, to each upper extremity of which is pivotally connected, in a way whereby it is able to rotate with respect to the axes of the said rods, an arm which, furthermore, is pivotally connected to the said frame.

5. Machine according to claim 1, in which the second conveyor is defined by two longitudinal sections, integral with the said frame, for supporting and guiding a plurality of baking tins that are aligned and are subjected to drive means set in intermittent operation by the said third drive means, and wherein there is a crosspiece, the extremities of which are pivoted to supports integral with the said sections, this provided in the center with a downward pointing rod of a width less than that of the baking tins, so positioned as to define the counter-blade of the said cutting means, as well as to be intercepted by the front walls of the said baking tins with the consequent rotation, in a predetermined direction, of the said crosspiece; the said crosspiece being, furthermore, provided with at least one projection, the abutment of which against a member integral with the said frame prevents the said crosspiece from rotating in the opposite direction to the said predetermined direction.

* * * * *